(12) United States Patent
Monkowski

(10) Patent No.: US 6,314,396 B1
(45) Date of Patent: Nov. 6, 2001

(54) AUTOMATIC GAIN CONTROL IN A SPEECH RECOGNITION SYSTEM

(75) Inventor: Michael D. Monkowski, New Windsor, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/187,439

(22) Filed: Nov. 6, 1998

(51) Int. Cl.[7] .............................. G10L 11/02; G10L 15/00
(52) U.S. Cl. ................................ 704/233; 704/234
(58) Field of Search .................... 704/214, 215, 704/208, 210, 226–228, 233, 234, 255, 256, 252

(56) References Cited

U.S. PATENT DOCUMENTS

| | | |
|---|---|---|
| 4,028,496 | 6/1977 | LaMarche et al. . |
| 4,277,645 * | 7/1981 | May, Jr. ............................. 704/233 |
| 4,331,837 | 5/1982 | Soumagne . |
| 4,696,039 | 9/1987 | Doddington . |
| 4,696,040 | 9/1987 | Doddington et al. . |
| 4,807,167 | 2/1989 | Green, Jr. . |
| 4,817,158 | 3/1989 | Picheny . |
| 5,195,138 | 3/1993 | Kane et al. . |
| 5,598,505 * | 1/1997 | Austin et al. ....................... 704/226 |
| 5,689,615 * | 11/1997 | Benyassine et al. ............... 704/219 |
| 5,937,375 * | 8/1999 | Nakamura ......................... 704/215 |
| 6,076,057 * | 6/2000 | Narayanan et al. ............... 704/256 |

FOREIGN PATENT DOCUMENTS

| | | |
|---|---|---|
| 62290258 | 12/1987 | (JP) . |
| 253369 | 2/1990 | (JP) . |
| 2189061 | 7/1990 | (JP) . |
| 329555 | 2/1991 | (JP) . |

* cited by examiner

Primary Examiner—David D. Knepper
(74) Attorney, Agent, or Firm—F. Chau & Associates, LLP

(57) ABSTRACT

Energy normalization in a speech recognition system is achieved by adaptively tracking the high, mid, and low energy envelopes, wherein the adaptive high energy tracking value adapts with weighting enhanced for high energies, and the adaptive low energy tracking value adapts with weighting enhanced for low energies. A tracking method is also provided for discriminating waveform segments as being one of "speech" or "silence", and a measure of the signal to noise ratio and absolute noise floor are used as feedback means to achieve optimal speech recognition accuracy.

21 Claims, 3 Drawing Sheets

AUTOMATIC GAIN CONTROL IN A SPEECH RECOGNITION SYSTEM

BACKGROUND OF THE INVENTION

1. Field of the Invention

The present invention relates to speech recognition systems. More particularly, the invention is directed to a system and method for normalizing a voice signal in a speech pre-processor for input to a speech recognition system.

2. Discussion of the Prior Art

A well recognized goal of speech recognition systems (hereinafter SR systems) is that of normalizing the voice signal to be processed, including its energy. Normalizing a voice signal enables successful comparison of the unknown spoken information with stored patterns or models. The process of energy normalization generally involves removing the long term variations and bias in the energy of the voice signal while retaining the short term variations that represent the phonetic information. The process of energy normalization enhances the accuracy of the SR system in proportion to the degree of normalization applied.

The undesirable long term variations in the energy of a voice signal can typically arise from multiple sources. A common source of energy variation comes from variations in microphone gain and placement. Current SR systems are very sensitive to variations in both the microphone gain and placement. Improper gain and/or placement result in higher error rates. At present, the only way to accommodate the SR system is to use an offline microphone setup to set the gain. This, however, presents several disadvantages. First, it is an added burden on the user. Second, it does not measure the audio quality on-line, and so does not detect changes that happened since the setup. Third, it does not measure the feature that is most relevant to the SR system: the instantaneous signal to noise ratio.

Additional contributing factors to energy variation, a which leads to higher error rates, include the intensity of a speaker's voice which will typically exhibit a large dynamic range. A further general problem is that different speakers will have different volume levels. Thus, the variations in amplitude or energy that occur between different utterances of the same word or sentence by different speakers, or even by the same speaker at different times, must be eliminated or at least reduced.

In the prior art, hardware solutions in the form of automatic gain controls have been used on sound cards to achieve energy normalization of raw signals. However, the degree of normalization provided by such cards has proven to be inadequate for the purposes of speech recognition.

The use of an unbiased mean value has also been used in the prior art, however, since the relative amounts of speech, silence, and noise contained within the signal is not known in advance an unbiased mean value is not a reliable norm. The peak value of the energy provides a more reliable norm, however, there is an associated drawback in tracking peak energy in that the system may suffer from being too sensitive to the instantaneous variations in energy. It is therefore desirable to have a reliable indicator of peak energy without being overly sensitive to peak energy variations.

A further general problem associated with energy normalization is that of silence detection. The signal energy is not a good indicator of silent periods because of background static. Static on one system could be at the level of speech on another system. Having no control over the sound cards and microphones that are used, it is therefore desirable to have some alternate measure of the silence level.

SUMMARY OF THE INVENTION

It is therefore a general object of the present invention to devise a system and method of speech signal normalization for eliminating or reducing variations in signal energy prior to a speech recognition process.

It is a particular object of the present invention to provide a method which can perform energy normalization of voice signals.

It is a further object of the present invention to discriminate between passages of silence and speech in a voice signal.

It is a still further object of the present invention to give the user of an SR system, feedback means for achieving optimal speech recognition accuracy.

It is yet a further object of the present invention to provide a method for normalizing a voice signal which can rapidly respond to the energy variations in a speaker's utterance.

It is a further object of the present invention to provide a method that will not distort the tracking of energy peaks during periods of silence.

These objects and other advantages are achieved by a voice normalization method and device which normalizes the energy in a voice signal by removing the long term variations and bias in the energy of the signal while retaining the short term variations that represent the phonetic information. A method of the present invention constructs a plurality of distinct energy tracks, preferably a high, mid, and low energy track. The values are mathematically smoothed and then used to track the upper and lower energy envelope of the voice signal. The smoothed high energy track is used to normalize the energy in the signal. The method further derives two figures of merit; a signal to noise ratio, and a measure of the noise floor, both of which are used to provide feedback means to a user of the SR system.

The present invention further provides a novel method for discriminating between periods of silence and speech in the voice signal.

In the preprocessor, there is provided an analyzer connected to receive a digital speech signal and generate therefrom a sequence of frames. Each frame has a plurality of samples from said digital speech signal. A device is further provided for tracking the energy in one or more consecutive frames of said digital speech signal by constructing a plurality of energy tracks to track the upper energy envelope, an average energy, and a lower energy envelope. Another device is yet further provided for calculating a value of normalized energy. Another device is yet further provided for providing the normalized energy to a speech recognition preprocessor. Another device is yet further provided for measuring the signal to noise ratio and absolute noise floor in one or more consecutive frames of said digital speech signal. Another device is yet further provided for displaying said signal to noise ratio and absolute noise floor to a user as a continuous display for providing feedback means to achieve optimal speech recognition accuracy. And, another device is yet further provided for discriminating between intervals of silence and speech in said digital speech signal.

According to the present invention, there is provided a method of normalizing energy in a voice signal. The method calculates a high energy track for tracking the upper energy envelope of said voice signal. The method further calculates a low energy track for tracking the lower energy envelope of said voice signal. The method yet further calculates a mid energy track for tracking the average energy of said voice signal. And, the method yet further calculates a value of normalized energy from said high energy track to be provided to a speech recognition system.

The invention and its operation will become more apparent from the following description of preferred embodiments and from the accompanying drawings.

DETAILED DESCRIPTION OF PREFERRED EMBODIMENTS

The particular software implementation of the present invention should not be seen as limiting because the present invention may be implemented either wholly or in part in hardware.

Figure 1:
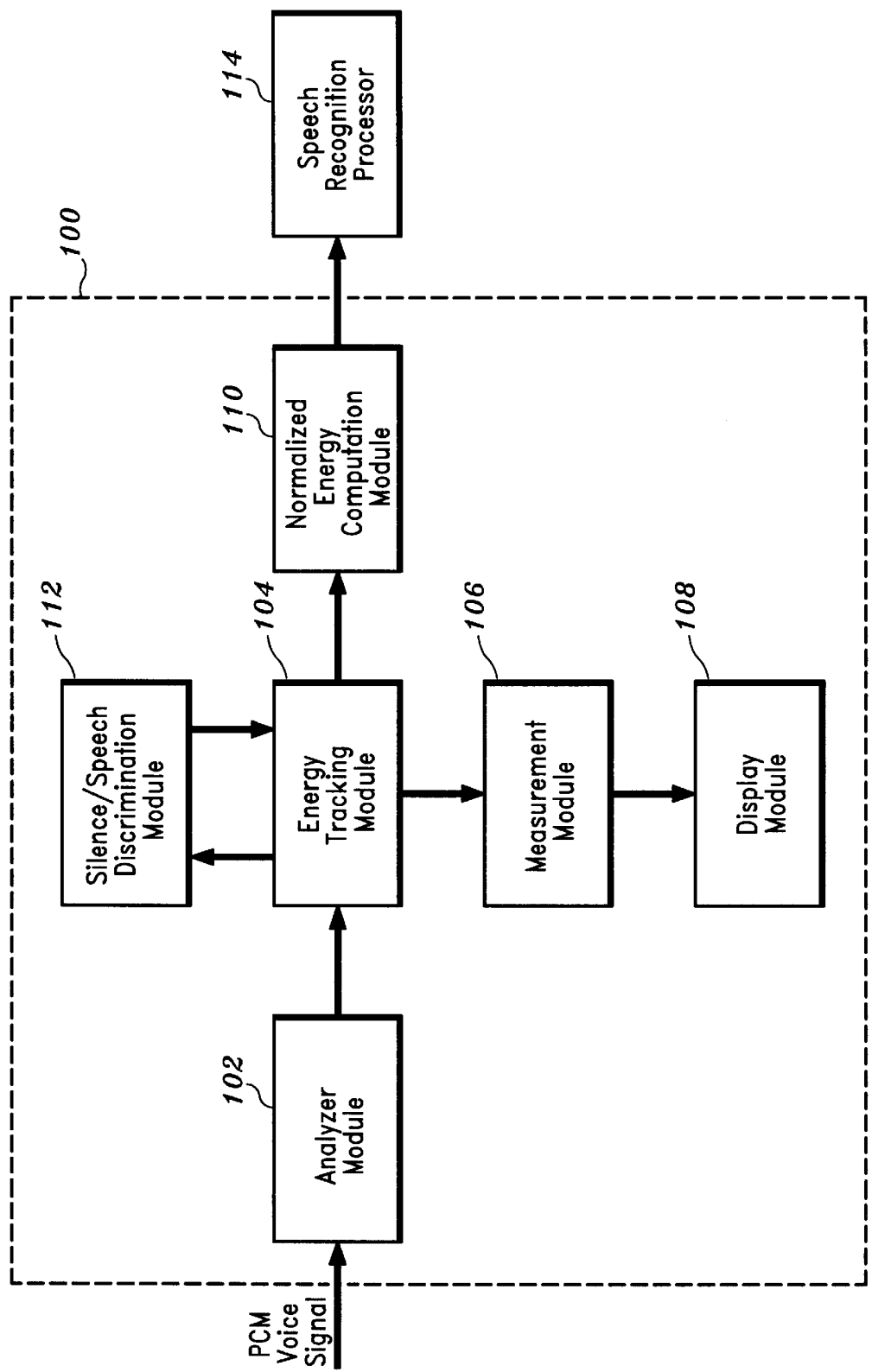
FIG. 1 is a block diagram of a speech recognition pre-processor in accordance with the present invention, in conjunction with a speech recognition processor.

Referring initially to FIG. 1, a block diagram is shown of a speech recognition pre-processor 100 to which the present invention is applied, in conjunction with speech recognition system 114. The speech recognition pre-processor 100 includes an analyzer module 102 operatively coupled to an energy tracking module 104. The energy tracking module 104 is operatively coupled to a normalized energy computation module 110 and to a measurement module 106. The normalized energy module 110 is coupled to the speech recognition processor 114. The measurement module 106 is coupled to a measurement display module 108.

The analyzer module 102 receives a PCM voice signal as input. The analyzer module 102 partitions the PCM voice signal into a plurality of consecutive non-overlapping frames. Each frame represents a fixed time slice of the PCM waveform containing some number of digital samples. The divided PCM waveform is provided to the energy tracking module 104.

The energy tracking module 104 receives the framed PCM waveform data as input and constructs an observation window that is incrementally shifted in discrete shift increments at times: (t, t+delta, t+(2*delta), etc . . . ), over the entire waveform. At each shift increment of the observation window, one or more frames of the PCM waveform will be contained within the observation window. At each shift increment of the observation window a feature vector is computed from the frame data located inside the window. One of the computed features of the feature vector is the RMS energy of the speech signal, preferably measured in decibels. In addition to the RMS energy, the zeroeth cepstral coefficient, C0, is also computed as part of the feature vector. The method may use either the RMS energy or C0 to represent the instantaneous energy of the signal. The computed energy feature is used to calculate a plurality of energy tracks, preferably high, mid and low. The high energy track, Ahigh(t), is calculated to track the upper envelope of the signal energy, the mid energy track, Amid(t), is calculated to track the average signal energy, and the low energy track, Alow(t), is calculated to track the lower envelope of the signal energy. The high and low energy tracks are computed by summing two weighted terms wherein the weighting coefficients adapt to changes in the currently observable signal energy for the current shift increment. The middle energy track utilizes constant non-adaptable weighting coefficients. Each of the three energy tracks is of the general form of a running sum, defined by as:

$$\text{current\_running\_sum}(t) = (\text{previous\_running\_sum}(t-1)*w1) + (\text{currently\_observed\_value}(t)*(1-w1)) \quad [\text{Eq. 1}]$$

Variables (t), and (t−1) represent the shift increment times associated with the observation window, wherein time (t) represents the time associated with a current shift increment and time (t−1) represents the time associated with the most recent shift increment of the observation window. Further, Equation 1 is recursive whereby the previous running sum, at time (t−1), is added to a currently observed value at time (t) to generate a current running sum at time (t). Further, both the current and previous running sums represent mean values. As such, the high, mid, and low energy tracks, generally represented by equation 1, will hereinafter be respectively referred to as the high biased running mean, unbiased running mean, low and biased running mean. The details associated with the particular calculation for each of the three energy tracks will be provided below.

Subsequent, to computing the high bias, unbiased, and low bias running mean values, the energy track module 104 further calculates smoothed values for both the high and low bias running mean values, in the log domain, Epeak(t) and Efloor(t). The smoothed values measure the high and low energy envelopes of the PCM waveform, respectively. The smoothed values, however, are not indiscriminately computed at each shift increment, they are instead selectively computed at each shift increment depending upon whether the frame data contained within the observation window for the current shift increment is characterized as being an interval of speech or silence. To make such a determination, the energy tracking module 104 provides as input to the speech/silence discrimination module 112, the unbiased running mean, Amid(t), and the low biased running mean, Alow(t). The speech/silence discrimination module 112 compares the unbiased running mean with the low biased running mean, and whenever the unbiased running mean is within some pre-defined threshold, Athresh, of the low biased running mean that interval is labeled a silence interval. Correspondingly, whenever the unbiased running mean, Amid(t) is greater than the low biased running mean value by the pre-defined threshold, Athresh, the interval is labelled a speech interval. The speech/silence determination result is provided as input to the energy tracking module 104 to insure that the high biased smoothed value, Epeak(t) is only updated for those intervals determined to be speech intervals. Correspondingly, the energy tracking module 104 only updates the low biased smoothed value, Efloor(t), only for those intervals determined to be silence intervals. Selectively updating the high and low bias smoothed values facilitates the optimal tracking of the high and low energy envelopes. For speech intervals, the smoothed low bias running mean, Efloor(t), is held constant (gated) to its value computed at the most recent silence interval. Correspondingly, for silence intervals, the smoothed high bias running mean, Epeak(t), is held constant(gated) to its value computed at the most recent speech interval. If the gating operation was not performed the smoothed high biased running mean value, Epeak(t), would eventually fall to the silence level during long segments of silence. Similarly, the low biased running mean value, Efloor(t), would eventually rise into the levels of speech during long segments of speech. The details of discriminating each interval as one of speech or silence will be described in connection with the preferred embodiment.

The energy tracking module 104 provides the smoothed high and low bias running mean values, Epeak(t) and Efloor(t), to the measurement module 106, and further provides Epeak(t) and the instantaneous energy observed at the current shift increment to the normalized energy computation module 110.

The measurement module 106 utilizes the provided inputs to calculate an estimate of the peak S/N ratio, and a figure for the absolute noise floor for the current shift increment. The S/N ratio and absolute noise floor values are in turn provided as input to a display module 108 to provide feedback to the user of the Speech recognition (SR) system as an indication of his audio quality.

The smoothed high bias running mean value, Epeak(t), is provided as input to the normalized signal energy module 110 Epeak(t) to calculate the normalized signal energy, Enorm(t) for the current shift increment. Enorm(t) is computed by subtracting the energy feature, either RMS energy or Co, from Epeak(t). The result is then provided as input to the speech recognition module 114 for processing.

Figure 2:
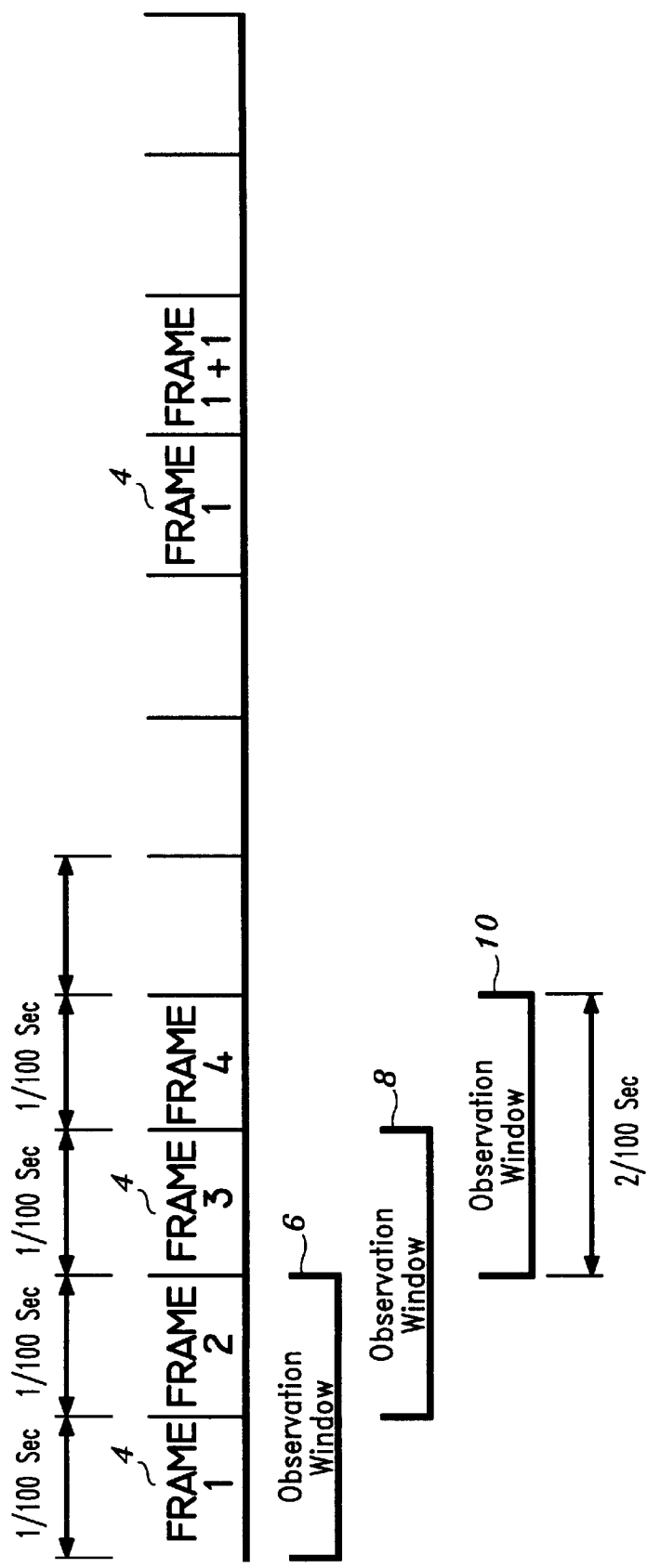
FIG. 2 shows a sample construction of a PCM waveform and associated observation window for practicing the present invention.

Referring to FIG. 2, An exemplary embodiment of the present invention is illustrated. FIG. 2 illustrates a PCM voice signal 2 as a series of consecutive frames 4. Each frame represents a 1/100 second time slice of the PCM waveform. Also shown is an observation window 6 of width 2/100 seconds which is incrementally shifted over the PCM waveform from start to end in shift increments of 1/100 seconds. The exemplary embodiment illustrates an observation window that is twice the width of a frame. Given the respective widths and shift increment magnitude, each frame will be sampled twice.

Figure 3:
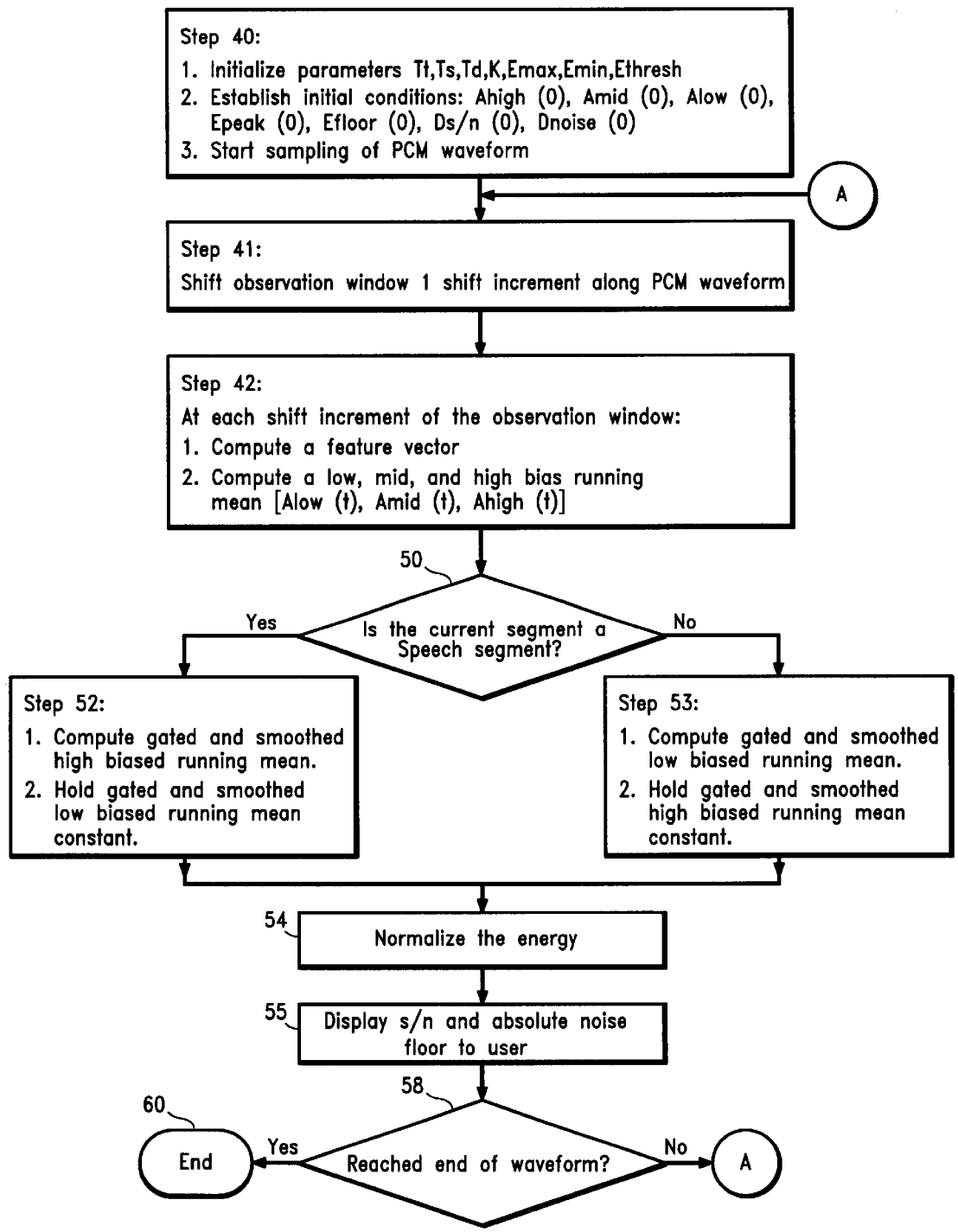
FIG. 3 is a flow diagram illustrating the removal of long term variations and bias in the energy of a voice signal according to the present invention.

Referring now to FIG. 3, a flow diagram illustrates the method steps performed at each shift increment of the observation window. Beginning at step 40, a number of parameters are initialized at time zero, they include: a tracking time constant, Tt, a smoothing time constant, Ts, a display time constant, Td, a contrast adjustment for bias weighting, K, an expected maximum observed value, Emax, an expected minimum observed value, Emin, a noise threshold for speech/silence discrimination, Ethresh measured in dB, and by conversion to the linear domain Athresh.

In addition to initializing parameters, a number of initial conditions are established, they include initial values for the high bias running mean, Ahigh(0), which is initialized to the linear domain value of Emin, the expected minimum observed; a mid bias running mean initial value, Amid(0), also initialized to Emin; and an initial value for the low bias running mean energy track, Alow(0), initialized to the linear domain value of Emax, the expected maximum observed value. Further initial values include the gated and smoothed high energy track, Epeak(0), initialized to Emax, and Efloor(0), the gated and smoothed low track initialized to (Emax+Emin)/2. The display of the signal to noise ratio, Ds/n(0) is set to zero as well as the display of the noise floor Dnoise(0).

Further at time zero, the PCM waveform sampling rate of 22 k samples/sec is initiated, and the observation window is positioned to contain the first two frames of waveform data.

In the exemplary embodiment, sampling the PCM waveform at a rate of 22 k samples per second for a shift increment duration of 1/100 seconds yields 440 samples given an observation window width of 2/100 seconds (two frames).

At step 41 the observation window is shifted by 1/100 seconds,, (i.e. one shift increment along the PCM waveform). Referring now to FIG. 2, an observation window 6 is initially positioned to be located at a start of the PCM waveform at time, t=0. The observation window moves in time from a first frame to a last frame of the PCM waveform in discrete shift increments. FIG.2 illustrates a starting position of the observation window 6 and two successive shift increments 8 and 10 where each shift increment is equivalent to translation of the observation window in time by 1/100 seconds in the exemplary embodiment.

At step 42, a feature vector is computed from the 440 samples where one of the computed features is the RMS energy of the speech signal, $E_{obs}$, a log domain value measured in decibels. In addition to the RMS energy, C0, the zeroeth cepstral coefficient, is also computed as part of the feature vector. The method may use either the RMS energy or C0 to represent the instantaneous energy of the signal. In the exemplary embodiment, tracking is done in the linear domain ($A_{obs}$), however, other embodiments may track the instantaneous energy in either the linear or log domain. Conversion from the log domain (measured in decibels) to the linear domain is given by Eq. 2 as:

$$A_{OBS}(t)=10^{(K*obs(t)-E_{min})/(E_{max}-E_{min}))} \quad [\text{Eq. 2}]$$

The constant K determines the magnitude of the bias used for computing the running sums, and the remaining terms scale the energy to be in the range of 0 to 1, so that either the RMS energy or C0 can be used.

In addition to computing a feature vector the high, mid and low biased running mean values are calculated at each shift increment. The calculation for the high biased running mean, Ahigh(t), is described as:

$$Ahigh(t)=(Whigh(t)*Aobs(t))+((1-Whigh(t))*Ahigh(t-1)) \quad [\text{Eq.3}]$$

The calculation for the low biased running mean, Alow(t), is described as:

$$Alow(t)=(Wlow(t)*Aobs(t))+((1-Wlow(t))*Alow(t-1)) \quad [\text{Eq. 4}]$$

Where Whigh(t) and Wlow(t) in equations 3 and 4 represent adjustable weighting coefficients Whigh(t) and Wlow(t) are each computed as;

$$Whigh(t)=\min (1.0, (Aobs(t)/Ahigh(t-1))^2/Tt) \quad [\text{Eq.5}]$$

$$Wlow(t)=\min (0.5, (Alow(t-1)/Aobs(t))^2/Tt) \quad [\text{Eq.6}]$$

Equations 5 and 6 illustrate how the weighting coefficients adjust at each shift increment in response to the relative magnitude of the instantaneous observed amplitude, Aobs(t), and the previously computed high and low bias running mean values, Ahigh(t−1) and Alow(t−1), respectively. This adjustment capability at each shift increment is advantageous in that the high and low energy envelopes may be accurately tracked by adjusting the weighting coefficients in response to instantaneous variations in the signal level.

With specific reference to equations 3 and 5, when the currently observed value, Aobs(t) is much greater than Ahigh(t−1), the high biased running sum computed at the previous interval, the weight multiplier Whigh(t) would be adjusted upward (i.e. a value closer to 1) in equation 5 thereby giving proportionally higher weight to the Aobs(t) term in equation 3.

The weighting coefficient adjustment performed at each shift increment for the low biased running mean, Alow(t), is similar to the adjustment described for the high biased running mean, however, the weighting coefficient, Wlow(t), is adjusted to adapt to instantaneous changes in the low energy of the voice signal. Specifically, the relative magnitude of the instantaneous observed amplitude, Aobs(t), and the previously computed mean value, Alow(t−1) are compared and when the difference is large the weighting coefficient multiplier is adjusted in response. With specific reference to equations 4 and 6, when the current observation value, Aobs(t), is much lower than the previously computed low biased running mean, Alow(t−1), the weighting multiplier, Wlow(t) is adjusted upward in response, to rapidly adapt to the instantaneous large change in the low signal energy.

In addition to computing a high and low biased running mean value at each shift increment, the unbiased running mean (mid energy track), Amid(t), is computed and represents the running average of the voice signal's energy. The unbiased running mean, Amid(t), is calculated as:

$$A\text{mid}(t)=(W\text{mid}*A\text{obs}(t))+((1-W\text{mid})*A\text{mid}(t-1)) \quad [\text{Eq.7}]$$

The calculation of the unbiased running mean represents the average energy of the PCM waveform and is distinguishable from the previous calculations for the low and high biased running mean in that the weighting coefficient, Wmid, is constant and therefore does not change at each shift increment. As such, the calculation of the unbiased running mean is said to be energy independent. The weight multiplier Wmid in equation is calculated as:

$$W\text{mid}=1/Tt \quad [\text{Eq.8}]$$

Where Tt represents the tracking time constant, whose value is typically 0.1 seconds. The value for Tt is selected to be short enough to respond quickly to transitions from silence to speech, but long enough to ignore silences within words, such as stop consonants or low energy fricatives.

Step 50 is a determination step for discriminating between speech and silence. That is, at each shift increment of the observation window, a determination is made regarding whether the portion of the PCM waveform (i.e. digital samples) contained within the current position of the observation window constitutes an interval of silence or speech. To make that determination a comparison between the low biased running mean, Alow(t), and the unbiased running mean, Amid(t) is performed. Specifically, whenever the unbiased running mean, Amid(t) is within some pre-defined threshold, Athresh, of the low biased running mean that interval is labeled a silence interval. Correspondingly, whenever the unbiased running mean, Amid(t) is greater than the threshold, Athresh, the interval is labelled a speech interval. The threshold Athresh is computed as:

$$A\text{thresh}=10^{(K*(E\text{thresh}/(E\text{max}-E\text{min})))} \quad [\text{Eq.9}]$$

where Ethresh represents the noise threshold for a speech/silence determination low enough to ignore low energy consonants, and high enough to quickly detect the onset of silence. For example 5 dB. Emax and Emin represent the expected maximum and minimum values of the observations, respectively. For example, 80 dB and 0 dB.

When the current interval is determined to be a speech segment, a branch to step 52 occurs. At step 52, a smoothing operation is performed. Specifically, the high biased running mean, Ahigh(t), is mathematically smoothed yielding Epeak(t), (hereinafter referred to as the gated and smoothed high biased running mean).

In the exemplary embodiment the three energy tracks, (i.e., the high, mid, and low bias running mean values) are computed in the linear domain. However, the associated smoothed values for the high and low bias running mean values are computed in the log domain. To convert the linear high bias running mean from the linear to the log domain, equation 10 is provided:

$$E\text{high}(t)=E\text{min}+(\log_{10}(A\text{high}(t))*(E\text{max}-E\text{min})/K)) \quad [\text{Eq.10}]$$

Using Ehigh(t), the smoothed value for the high biased running mean (i.e. the gated and smoothed high bias running mean) is then calculated as:

$$E\text{peak}(t) \ (W\text{peak}(t)*E\text{high}(t))+((1-W\text{peak}(t))*E\text{peak}(t-1)) \quad [\text{Eq.11}]$$

Where Wpeak(t) represents the weighting coefficient for computing Epeak(t) and is calculated as:

$$W\text{peak}(t)=\min[1.0, (E\text{high}(t)-E\text{min})/(E\text{peak}(t-1)-E\text{min})))^2 /T_s] \quad [\text{Eq.12}]$$

At time zero the gated and smoothed high bias running mean, Epeak(0) is initially set to Emax, the expected minimum value of the observations. For example 80 dB. Epeak(t) will then rapidly adjust to the correct value in subsequent shift increments.

The value of Epeak(t) is updated in only those intervals determined to be speech intervals. Otherwise for those intervals determined to be silence intervals the value of Epeak(t) is held constant to its value last updated at the most recent speech interval. This is required because if the smoothed high biased running mean were updated at silence segments its value would eventually fall to the silence level during long segments of silence thereby limiting its ability to optimally track the high energy envelope.

Correspondingly, a smoothed low bias running mean, Efloor(t), will be updated at silence intervals and held constant (gated) at speech intervals. That is, at speech intervals the value will be held constant to that value updated at the most recent silence interval. Gating the gated and smoothed low bias running mean, Efloor(t), is required because otherwise the smoothed value would eventually rise into the levels of speech during long segments of speech.

If it is determined at determination step 50 that the interval is a silence interval, a branch to step 53 occurs. At step 53, the gated and smoothed low biased running mean is updated, Efloor(t). Efloor(t) is computed in the log domain. To compute Efloor(t) in the log domain it is necessary to first convert the low bias running mean, Alow(t), from the linear to the log domain.

$$E\text{low}(t)=E\text{min}+(\log 10(A\text{low}(t))*(E\text{max}-E\text{min})/K))[ \quad \text{Eq.13}]$$

The value of Elow(t) is then used to compute the gated and smoothed high bias running mean as:

$$E\text{floor}(t)=(W\text{floor}(t)*E\text{low}(t))+((1-W\text{floor}(t))*E\text{floor}(t-1)) \quad [\text{Eq.14}]$$

Where Wfloor(t) represents the weighting coefficient for computing Efloor and is computed as:

$$W\text{floor}(t)=\min((1.0, ((E\text{max}-E\text{low}(t)/(E\text{max}-E\text{floor}(t-1)))^2/Ts) \quad [\text{Eq.15}]$$

At was true for the gated and smoothed high biased running means, at time zero the gated and smoothed value, Efloor(0) is initially set to some value that estimates what the envelope should look like and then the value rapidly adjusts to the correct value in subsequent shift increments.

At step 54, the gated and smoothed high biased running mean, Epeak(t), is subtracted from the energy feature yielding the energy normalization vector, Enorm(t) which is used by the SR system. Enorm(t) is computed as:

$$E\text{norm}(t)=E\text{obs}(t)-E\text{peak}(t) \quad [\text{Eq.16}]$$

At step 55, the value of the gated and smoothed low biased running mean is output to a user as a measure of the absolute noise level.

A measure of the signal to noise ratio is also displayed to the user by computing the difference between the gated and smoothed high biased and low biased running mean values.

In the exemplary embodiment, an audio status indicator would be displayed to a user, similar in form to a standard VU meter. The audio status indicator would continuously display the computed signal to noise (s/n) ratio to the user. At very low signal to noise levels the indicator would display a blue bar indicating that the user's speech is mostly incomprehensible to the SR system and that some adjustment is in order. At higher levels of s/n, both a blue and yellow bar are displayed indicating that some speech recognition is being achieved by the SR system, however, the situation is far from ideal. At still higher levels of signal to noise, where speech recognition is optimum, a blue, yellow and green bar will be displayed. If the audio level is so high that the signal may be clipped, then a red bar is displayed along with the blue, yellow and green bars. It is the absolute audio level, rather than the s/n ratio that determines whether the red bar will be displayed. During segments of silence, a black frame is displayed around the color bars. It is removed during intervals of speech (a gray frame replaces the black bar and blends in with the background during speech). These indicators provide a concise summary of the status of the audio quality which impact the SR system. Alternative embodiments would include numeric values in addition to the indicators described above.

Step 58 is a determination step to decide whether the observation window has reached the end of the PCM waveform. If not, a branch occurs back to step 41 where the observation window will be translated along the waveform by one shift increment. Otherwise, the process terminates at step 60.

Thus, the present invention provides the objects described above, of energy normalization and of speech/silence discrimination.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A speech recognition preprocessor, comprising:

an analyzer for receiving a digital speech signal generating therefrom a sequence of frames, each frame having a plurality of samples from said digital speech signal;

means coupled to said analyzer means for tracking an upper energy envelope, an average energy envelope, and a lower energy envelope by a plurality of energy tracks in one or more consecutive frames of said digital speech signal, wherein said energy tracks are based on a high biased running mean, a low biased running mean and a nominally unbiased running mean; and means coupled to said tracking means for computing a normalized energy value and providing said normalized energy value to a speech recognition system.

2. A speech recognition preprocessor of claim 1, further including means, coupled to said tracking means, for measuring the signal to noise ratio and absolute noise floor in one or more consecutive frames of said digital speech signal.

3. A speech recognition preprocessor of claim 2, further includes means, coupled to said measuring means, for displaying said signal to noise ratio and absolute noise floor to a user as a continuous display for providing feedback means to achieve optimal speech recognition accuracy.

4. A speech recognition preprocessor of claim 1, further including means, coupled to said tracking means, for discriminating between intervals of silence and speech in said digital speech signal.

5. A method of normalizing energy in a voice signal, said method comprising the steps of:

dividing the voice signal into a plurality of consecutive time intervals;

calculating a high energy track for tracking the upper energy envelope of said voice signal;

calculating a low energy track for tracking the lower energy envelope of said voice signal;

calculating a mid energy track for tracking the average energy envelope of said voice signal, wherein said high energy track, said low energy track and said mid energy track are based on a high biased running mean, a low biased running mean, and a nominally unbiased running mean, respectively; and calculating a value of normalized energy from said high energy track to be provided to a speech recognition system.

6. The method of claim 5, further comprising characterizing each time interval as being one of a speech interval or a silence interval.

7. The method of claim 5, wherein the high energy track is updated in only those time intervals determined to be speech intervals and held constant for those time intervals determined to be silence intervals.

8. The method of claim 5, wherein the low energy track is updated for those time intervals determined to be silence intervals and held constant for those time intervals determined to be speech intervals.

9. The method of claim 5 further comprising providing a measure of the signal to noise ratio and absolute noise floor of said voice signal to a user as feedback to achieve optimal speech recognition accuracy.

10. The method of claim 9, wherein the signal to noise ratio is computed as the difference between the high energy track and the low energy track.

11. The method of claim 9, wherein the low energy track is output as a measure of the absolute noise floor.

12. A method of normalizing energy value in a PCM voice signal, said voice signal comprising a plurality of frames, each of said plurality of frames defining a fixed interval of said voice signal, said method comprising the steps of:

constructing an observation window whose width defines a current observation interval of said voice signal, said current observation interval encompassing a plurality of digital samples of said voice signal;

shifting said observation window discrete shift increments along said PCM voice signal;

at each discrete shift increment of the observation window;

computing a feature vector from said plurality of encompassed digital samples of said voice signal contained within said observation interval;

using said feature vector to compute a high biased running mean, a low biased running mean, and a nominally unbiased running mean;

determining whether said current interval is one of a speech interval and a silence interval;

based on the determination step, when said interval is a speech interval;

computing a gated and smoothed high biased running mean from said high biased running mean;

holding a gated and smoothed low bias running mean constant to a value computed at the most recent silence interval;

computing an energy normalization value from said gated and smoothed high biased running; and outputting said energy normalization value to a speech recognition system holding a gated and smoothed low bias running mean constant to a value computed at the most recent silence interval;

computing an energy normalization value from said gated and smoothed high biased running mean; and outputting said energy normalization value to a speech recognition system.

13. The method according to claim 12 wherein when said interval is a silence interval, the method further includes the steps of:

computing a gated and smoothed low biased running mean from said low biased running means;

holding a gated and smoothed high biased running mean constant to a value computed at the most recent speech interval;

computing an energy normalization value from said gated and smoothed high biased running mean; and outputting said energy normalization value to a speech recognition system.

14. The method according to claim 12, wherein the determination as to whether said current interval is one of a speech interval and a silence interval is made by comparing the nominally unbiased running mean with the low biased running mean.

15. The method according to claim 13, wherein the current interval is a silence interval whenever the a unbiased running mean is within a pre-defined threshold of the low biased running mean.

16. The method according to claim 13, wherein the current interval is determined to be a speech interval whenever the value of the unbiased running mean exceeds the value of the low biased running mean by some predefined threshold.

17. The method according to claim 12, wherein said feature vector further comprises the RMS energy and the zeroeth cepstral coefficient from said plurality of encompassed digital samples.

18. The method according to claim 12, wherein said high biased running mean computed at the current shift increment, t, is a weighted running mean computed as $$\text{high biased running mean}(t) = (\text{high biased running mean}(t-1)*w1) + (\text{currently observed value}(t)*(1-w1))$$

where w1 and (1−w1) represent weighting coefficients.

19. The method according to claim 17, wherein the weighting coefficients w1 and (1−w1) are adjustable at each shift increment in response to the relative magnitude of the high biased running mean computed at each shift increment and the currently observed value at the current increment.

20. The method according to claim 12, wherein said low biased running mean computed at the current shift increment, t, is a weighted running mean computed as $$\text{low biased running mean}(t) = (\text{low biased running mean}(t-1)*w1) + (\text{currently observed value}(t)*(1-w1))$$

where w1 and (1−w1) represent weighting coefficients.

21. The method according to claim 19, wherein the weighting coefficients w1 and (1−w1) are adjustable at each shift increment in response to the relative magnitude of the low biased running mean computed at each shift increment and the currently observed value at the current increment.

* * * * *